UNITED STATES PATENT OFFICE.

ALVIN T. CARSON, OF LIMON, COLORADO, ASSIGNOR, BY DIRECT AND MESNE ASSIGNMENTS, TO THE DOMESTIC PRODUCTS CORPORATION, OF EL PASO COUNTY, COLORADO, A CORPORATION OF COLORADO.

SANITARY ARTIFICIAL NEST-EGG.

1,263,527.      Specification of Letters Patent.      Patented Apr. 23, 1918.

No Drawing.      Application filed April 16, 1917. Serial No. 162,427.

*To all whom it may concern:*

Be it known that I, ALVIN T. CARSON, a citizen of the United States, and resident of Limon, in the county of Lincoln and State of Colorado, have invented a new and useful Sanitary Artificial Nest-Egg, of which the following is a specification.

The objects of my invention are first, the production of a sanitary artificial nest-egg for poultry, that will induce the poultry to be attracted to the shape and appearance of an artificial nest-egg; second, to produce a sanitary artificial nest-egg that will be durable so as to not be easily broken by rough usage; third, to produce a sanitary artificial nest-egg that will have a composition that will rub off and onto the feet of a hen and onto her feathers and that will produce a powder so fine that it will be obnoxious to the trachea of vermin insects, as the so-called mites, lice, and bugs; fourth, to provide a sanitary artificial nest-egg containing odorous substances adapted to dispel vermin and to destroy germ life.

I obtain these objects by means of the composition herein described in which an egg-shaped body is composed of very finely pulverized earthy matter, as talc, which may be of white, brown or pink earthy matter, intermixed with fine short fiber, as fine lint cut short and mixed with powder while in a plastic state. The powder I use to form the body is so fine and loose, as to rub off on coming into contact with any solid, as the feet or feathers of a fowl and will adhere to the feet and feathers of a fowl so as to be obnoxious to the vermin that may infest the feathers of the fowl.

It is well known that all vermin insects breathe through trachea, which trachea it is intended that the dust of our finely powdered material will obstruct so as to kill the insects. One of the objects in having the lint or fibrous substance intermixed with the talc, or other powered earthy matter, while in a plastic state, is to give it a more tenacious body, so that if it is accidentally dropped or roughly tossed about, it will not be easily broken. Another object of the fiber is to protect the surface of the nest-eggs so that they will wear off evenly, and when one part of the egg is more worn, it will present a woolly or hairy surface, that will protect that side or part of the surface more than the other part that has not been worn so much. I also intermix with the artificial egg, while in a plastic condition, about twelve and one half per cent. of naphthalene in a finely powdered condition which naphthalene acts as an odorous disinfectant against germ life, and is obnoxious and repellent to insects and other vermin.

I am not intending to confine my mixture to naphthalene alone but claim the right to add to the naphthalene and to substitute other similar obnoxious odorous substances. One of the objects of the introduction of the lint or fiber into the body of the nest-egg is to make it so porous as to allow the easy volatilization of the odorous material; another object is to make the nest-egg durable without making it so hard that it would not rub off easily.

I do not wish to confine my invention solely to artificial nest-eggs imitating in appearance the eggs of the common domestic hen, I claim the right to use my invention in imitation of eggs of various birds, as the turkey, the goose, the duck and others, and also using the composition of the talc or similar finely powdered earthy matter intermixed with lint, wool, cotton, hair, or other similar fiber for the purposes hereintofore explained and also for intermixing with these substances, while the powder is still in a plastic state from the use of water with said powder, naphthalene in about the proportion herein set forth, for the purpose of disinfecting cattle, horses, hogs, dogs, and other domestic animals by applying the powder to them. This I may do in the form of a small hand piece of the shape convenient to be rubbed upon the body of the animal, as of the shape of a bar of toilet soap, or other desirable form.

In using this term "sanitary artificial nest-egg," I mean the term to apply not only to those forms that are of the form of a bird's egg but to the form applied to rub on the back of a horse or a cow as the article will be composed of the same similar ingredients to suit the application to the use to which it is to be put; the object being to have the fine powder diffused so that it will be inhaled through trachea of the insects, as of lice.

To destroy nits and germs I use the eggs containing a proper mixture of the naphthalene, as the naphthalene is intended to be used to kill germ life and the life of the nits; but in the sanitary artificial nest-eggs used in the nests of hens that are hatching I use the nest-egg without the naphthalene as the naphthalene is detrimental to the life of the chick within the egg.

I am aware that prior to my invention artificial nest-eggs for the nests of poultry have been used in the form of an egg and that compositions of matters may have been used for the exterminating of vermin among poultry and for the extermination of vermin among domestic animals of various kinds. I therefore do not claim broadly the form of the nest-egg nor the broad use of insecticide upon cattle:

But I do claim:—

1. In a sanitary artificial nest-egg for poultry, an egg-shaped body composed principally of finely powdered earthy matter, as talc adapted to rub off and to rub into and onto the feathers, fluff, and feet of fowl, and having fine woolly fiber intermixed with said body while in a plastic state, and adapted to bind the body more rigidly together, said earthy matter being adapted to disinfect the fowl or vermin, as mites, lice, and other insects by clogging their trachea, substantially as set forth and for the purposes specified.

2. In a sanitary artificial egg, adapted to destroy insects and nits, a solid body, composed of a compressed composition of finely pulverized earthy matter, as talc, profusely intermixed with soft fibrous filaments adapted to bind the body together so that it retains its integrity when wet or when cracked and an intermixture of naphthalene or other substance of similar acrimonious odor adapted to the destruction of nits, substantially as set forth and for the purposes specified.

3. As an article of manufacture for an insecticide, a mixture of finely powdered earthy matter, as talc, fine soft fibrous filaments, as wool or cotton, and a pungent chemical, as naphthalene, with sufficient moisture to cause the whole to adhere into a solid body when submitted to great pressure, substantially as set forth and for the purposes specified.

ALVIN T. CARSON.

Witnesses:
W. D. Crawford,
Thos. Hughes.